Patented Mar. 30, 1954

2,673,834

UNITED STATES PATENT OFFICE 2,673,834

STABILIZATION OF PHENOL ALKYLATES

Donald R. Stevens, Wilkinsburg, and Samuel C. Camp, Richland Township, Allegheny County, Pa., assignors to Gulf Research & Development Company, Pittsburgh, Pa., a corporation of Delaware No Drawing. Application October 31, 1949, Serial No. 124,724

8 Claims. (Cl. 202—57)

This invention relates to the stabilization of phenol alkylates, and it is particularly concerned with a method of inhibiting the dealkylation of alkylated phenols when they are subjected to temperatures normally causing dealkylation.

Phenol or its homologs, such as the cresols, xylenols, and ethyl phenols, are readily alkylated with olefins, particularly the tertiary olefins (olefins capable of forming tertiary alcohols on hydration) in the presence of a catalyst such as sulfonic acids; sulfuric acid; alkyl esters of sulfuric acid; aluminum chloride; hydrogen chloride; zinc chloride; boron trichloride; boron trifluoride; complexes of boron trihalides with water, ethers, alcohols, etc.; and phosphoric acid. The resulting crude alkylate, however, is acidic and will tend to undergo dealkylation at elevated temperatures unless the acid component is removed or its dealkylation-promoting tendency inhibited. For example, when a mixture of meta- and para-cresol is alkylated with the isobutylene of a $C_4$ refinery gas cut in the presence of sulfuric acid, the resulting crude alkylate usually contains a mixture of mono- and di-tertiary-butyl para-cresol, and mono- and di-tertiary-butyl meta-cresol, together with some extraneous non-phenolic acidic materials such as sulfuric acid, mono-tert-butyl sulfate, mono-sec-butyl sulfate, di-sec-butyl sulfate, sulfonic acids, sulfones, and the like. The di-tertiary-butyl para-cresol is particularly useful as an antioxidant in petroleum products such as cracked gasoline, lubricating and insulating oils, greases, and the like. The di-tertiary-butyl meta-cresol is useful in the reclaiming of rubber, as a tackifier, and in the preparation of surface active agents, and also is a useful starting material in processes of chlorination, nitration, hydrogenation, vinylation, sulfurization, aldehyde condensation, and the like. The mono-tertiary-butyl cresols may be treated with sulfur dichloride to form rubber stabilizers or they can be recycled for further alkylation. Accordingly, it is desirable to fractionate the crude alkylate to obtain cuts predominating in a single phenolic compound.

Before the crude alkylate is fractionated, however, it must be stabilized against dealkylation because the non-phenolic acidic materials present in the alkylate act as dealkylation catalysts even at the temperatures requires for vacuum distillation. Stabilization of the alkylate is important, of course, not only when the alkylate is subjected to fractional distillation but also when the alkylate is subjected to temperatures normally causing dealkylation in the presence of small amounts of acidic materials. Such temperatures are often encountered when the alkylate is used as a chemical intermediate.

We have found that an alkylate stabilized against dealkylation at elevated temperatures can be obtained by treating the crude acidic alkylate in steps comprising washing the acidic alkylate with a non-acid aqueous medium and thereafter contacting the washed alkylate with an adsorbent clay.

The first step of the process, i. e., washing of the acidic alkylate with a non-acid aqueous medium, removes the water-soluble and easily neutralizable materials from the alkylate, such as free sulfuric acid, mono-tert-alkyl sulfates, mono-sec-alkyl sulfates, and sulfonic acids. In the second step, the washed alkylate is contacted with an adsorbent clay whereby the dealkylation-promoting tendency of the remaining acidic bodies consisting of the more refractory materials such as di-sec-alkyl sulfates, sulfones, and the like, is inhibited.

In the first step of the process, we use a neutral or basic aqueous material which effectively removes the water-soluble and the easily neutralizable acidic material from the acid alkylate. Naturally, if the alkylated phenol is soluble in, or reacts with, dilute aqueous alkali solutions, we will employ only water for washing purposes in the first step. However, in the case of meta- or para-cresol, the alkylated derivatives are not soluble in, and do not react with, dilute aqueous alkali solutions so that the crude acidic alkylated cresols can be washed with either water or dilute aqueous alkali solutions. For example, we have found that water and dilute solutions of aqueous caustic soda produce good results. Aqueous solutions of other alkalies, such as potassium hydroxide and ammonium hydroxide, can also be used. In some instances where the alkylate is strongly acid, an economic procedure to follow is to wash the crude alkylate first with water and then with a dilute aqueous alkali solution, i. e., aqueous 5 to 10 per cent alkali solution. The amount of solution used will vary depending upon the acid content of the alkylate.

The washing step can be readily carried out either in batch or continuous operation either at room temperature or at an elevated temperature. In batch operation the acidic phenol alkylate is introduced into a vessel along with a suitable quantity of the non-acid aqueous solution. The alkylate and the aqueous solution are then agitated together for a time sufficient to remove the water-soluble and the easily neutralizable acidic material. The mixture is then allowed to settle and the aqueous phase is separated from the non-aqueous phase. If desired, this washing step may be repeated. The non-aqueous phase, herein referred to as the "washed alkylate," is then contacted with the clay adsorbent.

The clay contacting step can be carried out either by percolation or by contact filtration. In accordance with the percolation treatment, the washed alkylate is passed through a bed of granular clay contained in a vertical vessel. The contacting can be carried out under atmospheric or superatmospheric pressures and at a temperature between about 70° and 150° C. The rate at which the alkylate is passed through the bed of clay will vary with the depth of the bed of clay, the size of the clay particles, the acidity of the alkylate being treated, the degree of stabilization desired and the contacting temperature. When contact filtration is employed, the washed alkylate is mixed with amounts of fine clay (8 to 100 mesh size) ranging from 0.5 to 5 or more pounds per gallon of alkylate. The alkylate and clay are then agitated at a temperature between about 70° and 150° C. for a time sufficient to effect stabilization of the alkylate. The time naturally depends upon the size of the clay particles, the amount of clay used, the acidity of the alkylate being treated, the degree of stabilization desired, and the contacting temperature. Ordinarily, the contacting time is in the order of from 10 to 120 minutes. When low contacting temperatures are employed, longer time is required, and conversely a higher temperature at a shorter time may be used. Spent clay is removed from the alkylate by filtration. The treated alkylate obtained from the clay contacting step should be substantially neutral. However, herein and in the appended claims we refer to this alkylate as a stabilized alkylate rather than as a neutralized alkylate.

The adsorbent clays which we have found suitable for the purposes of our invention include such materials as Georgia clay, Floridin, Attapulgus clay, diatomaceous earth, fuller's earth, and the like. These clays are customarily used in the form of 30 to 60-mesh granules, although smaller "fluid" type particles or larger granules or pellets can be used. These clays are advantageously activated by heating them at a temperature above 200° C. While a dehydration temperature of 350° C. or higher can be used for activating the clays, care should be taken to avoid approaching the sintering temperature.

In order to obtain an indication of the amount of the acidic material present in the alkylate, we have resorted to the use of the saponification number test (ASTM D94-41T) commonly used for determining the saponifiable material in animal, vegetable or mineral oils. The saponification number, however, does not necessarily give an accurate indication of the amount of the non-phenolic acidic material present in any alkylated phenol. For example, if phenol itself is alkylated, a portion of the alkylated product may react with the caustic potash used in carrying out the saponification number test with the result that a higher saponification number would be obtained. In general, however, the increase in the saponification number resulting from the reaction of the phenolic material with the alkali is so small that it can be disregarded.

When the alkylate introduced into step one contains non-phenolic acidic material in an amount sufficient to give a saponification number of about 15 or 20, the alkylate is advantageously washed until the saponification number is reduced to about 2. While the washing need not be carried out to this extent, it is desirable to reduce the acidity of the alkylate in the first step as much as can be conveniently accomplished in order to keep at a minimum the amount of clay contacting required in the second step. In commercial practice the extent of the washing depends upon the relative cost of the washing as compared with the cost of the additional amount of clay contacting required when the acidity of the alkylate is not reduced to an amount corresponding to a saponification number of about 2 in the washing step.

The effectiveness of stabilizing crude alkylate in steps comprising washing the alkylate with a non-acid aqueous medium and then contacting the washed alkylate with an adsorbent clay will be demonstrated by the following dealkylation test in which a given amount of treated alkylate is subjected to fixed dealkylation heating conditions so that the results in a series of tests are directly comparable.

In carrying out this test, 10 grams of treated alkylate are placed in a glass chamber of about 50 milliliter capacity surrounded by a bath of vapors from boiling nitrobenzene. The chamber is connected through a condenser to a gasometer filled with saturated salt water for collecting the gas evolved. In this way the extent of the dealkylation occurring is indicated by the volume of gas collected in the gasometer, which corresponds to the volume of salt water displaced. In this test the alkylate is heated at about 205° C. for two hours, and the volume of gas collected at the end of 30, 60 and 120 minutes is noted and recorded. The recorded figures thus give numerical values which can conveniently be used to compare and evaluate the respective stabilization efficiency of different stabilizing procedures.

In the application of the above test to commercial practice an alkylate is considered to be completely stabilized when the amount of gas collected between 30 and 120 minutes ($\Delta$ 120–30) is zero. In strongly acidic alkylates, however, substantial dealkylation may take place in the first 30 minutes, in which case the amount of gas collected during the next 90 minutes may be small. Thus in evaluating the stabilization efficiency of a particular stabilizing process the $\Delta$ 120–30 value should be considered in connection with the volume of gas collected during the first 30 minutes. For instance, a 10 gram portion of an acidic di-tertiary-butyl cresol may have a $\Delta$ 120–30 value as low as 90, but the volume of gas given off in the first 30 minutes may be as much as 1750 cc., indicating almost complete dealkylation. Theoretically, a 10 gram portion of a di-tertiary-butyl cresol should upon dealkylation produce about 1900 cc. of isobutylene.

Even with stabilized alkylates some gas is collected at the start of the test as a result of the expansion of air dissolved in, or introduced along with, the sample, and also from expansion of residual moisture contained in the alkylate. To determine what portion of the initial gas collected may result from the expansion of air in the heating zone of the dealkylation apparatus, a 10 gram sample of pure 2,6-di-tertiary-butyl para-cresol was introduced and heated. At the end of 120 minutes, 40 cc. of gas had collected.

The 40 cc. of gas collected is thus considered to be a measure of the air introduced into the system along with the sample. To determine what portion of the initial gas may result from the combined air and moisture content, a 10 gram sample of alkylate was treated by refluxing for several hours in 100 grams of absolute alcohol containing 10 grams of potassium hydroxide. The alkylate was then water-washed and allowed to stand overnight in a desiccator containing $P_2O_5$. A measurement in the dealkylation apparatus showed 120.0 cc. of gas evolved in 30 minutes and 137.0 cc. at the end of 120 minutes. The 137 cc. of gas is considered to correspond to the air and moisture content introduced with the sample. Accordingly, in the following examples gas volumes higher than about 140 cc. may be considered to be isobutylene.

In the following specific examples the alkylate was obtained by alkylating a close-boiling meta-para-cresol mixture with the isobutylene contained in a refinery $C_4$ cut using 5 per cent of concentrated sulfuric acid as the catalyst. The alkylate thus obtained had a saponification number of 15.1. The alkylated derivatives of the cresols do not react with, and are not soluble in, dilute aqueous alkali solutions; therefore, this saponification number is considered to be an accurate indication of the non-phenolic acidic material present in the alkylate. Likewise, in the following examples the saponification numbers of the alkylated cresols are an accurate measurement of the non-phenolic acidic material present. Example 1 corresponds to step one of the invention and Example 2 corresponds to step two of the invention.

*Example 1*

In this example a sample of the alkylate having a saponification number of 15.1 was washed at room temperature with an excess of aqueous 10 per cent NaOH. The washed alkylate had a saponification number of 1.2. When the alkylate was subjected to the above-described dealkylation test there were 402.0 cc. of gas collected in 30 minutes and 1185.0 cc. of gas collected at the end of 120 minutes. From this it is evident that the alkylate washed only with an excess of 10 per cent NaOH is not completely stabilized.

*Example 2*

In this example, 100 grams of the washed alkylate having a saponification number of 1.2 obtained as described in Example 1 was passed down through a 12-inch column containing 22 grams of fuller's earth at 95° C. The fuller's earth had previously been activated by heating it at 250° C. for 12 hours. Forty minutes were required for the passage of the alkylate through the bed. The results obtained when the washed and the clay treated alkylates were subjected to the dealkylation test are given in the following table.

|  | Gas Collected (cc.) | | | $\Delta120-30$ |
|---|---|---|---|---|
|  | 30 min. | 60 min. | 120 min. |  |
| Washed Alkylate | 402.0 | 798.0 | 1185.0 | 783.0 |
| Clay Treated Alkylate | 104.0 | 118.0 | 140.0 | 36.0 |

As evidenced from the above data, the washed alkylate was strikingly improved by the clay treatment. The 140 cc. of gas collected at the end of 120 minutes is considered to result largely from the air and moisture content introduced with the sample.

While the invention has been described herein with particular reference to certain embodiments and specific examples by way of illustration, it is to be understood that the invention is not limited to such embodiments and specific examples except as hereinafter defined in the appended claims.

We claim:

1. A method of inhibiting the dealkylation of crude acidic alkylated phenols at elevated temperatures which comprises washing said alkylated phenols with a non-acid aqueous medium to remove substantially all of the water-soluble and the easily neutralizable acidic material, stabilizing the washed alkylate by contacting said washed alkylate with an adsorbent clay at a temperature between about 70° and 150° C. for a time sufficient to effect stabilization of the alkylate but insufficient to effect dealkylation of the alkylate, and separating the stabilized alkylate from the adsorbent clay.

2. A method of inhibiting the dealkylation of crude acidic alkylated phenols at elevated temperatures which comprises washing said alkylated phenols with water to remove substantially all of the water-soluble and the easily neutralizable acidic material, stabilizing the washed alkylate by contacting said washed alkylate with an adsorbent clay at a temperature between about 70° and 150° C. for a time sufficient to effect stabilization of the alkylate but insufficient to effect dealkylation of the alkylate, and separating the stabilized alkylate from the adsorbent clay.

3. In the process of separating crude acidic alkylated phenols by fractional distillation the improvement which comprises washing said alkylated phenols prior to distillation with a non-acid aqueous medium to remove substantially all of the water-soluble and the easily neutralizable acidic material, stabilizing the washed alkylate by contacting said washed alkylate with an adsorbent clay at a temperature between about 70° and 150° C. for a time sufficient to effect stabilization of the alkylate but insufficient to effect dealkylation of the alkylate, and separating the stabilized alkylate from the adsorbent clay.

4. A method of stabilizing an acidic phenol alkylate which comprises washing said alkylate with a non-acid aqueous medium to remove substantially all of the water-soluble and the easily neutralizable acidic material, stabilizing the washed alkylate by contacting said washed alkylate with an adsorbent clay at a temperature between about 70° and 150° C. for a time sufficient to effect stabilization of the alkylate but insufficient to effect dealkylation of the alkylate, and separating the stabilized alkylate from the adsorbent clay.

5. The method of claim 4 wherein the non-acid aqueous medium consists of water.

6. The method of claim 4 wherein the non-acid aqueous medium is a dilute aqueous alkali solution.

7. A method of stabilizing an acidic phenol alkylate which comprises washing said alkylate with an excess of aqueous 10 per cent NaOH at room temperature to remove substantially all of the water-soluble and the easily neutralizable acidic material, stabilizing the washed alkylate by contacting said washed alkylate with activated fuller's earth at 95° C. for a time sufficient to effect stabilization of the alkylate but insufficient to effect dealkylation of the alkylate, and separating the stabilized alkylate from the fuller's earth.

8. A method of stabilizing an acidic phenol alkylate which comprises washing said alkylate with water, separating the non-aqueous phase from the aqueous phase, washing the non-aqueous phase with a dilute aqueous alkali solution, stabilizing the alkali-washed alkylate by contacting said alkali-washed alkylate with an adsorbent clay at a temperature between about 70° and 150° C. for a time sufficient to effect stabilization of the alkylate but insufficient to effect dealkylation of the alkylate, and separating the stabilized alkylate from the adsorbent clay.

DONALD R. STEVENS.
SAMUEL C. CAMP.

References Cited in the file of this patent
UNITED STATES PATENTS

| Number | Name | Date |
|---|---|---|
| 1,507,692 | Smith | Sept. 9, 1924 |
| 1,695,198 | Merrill | Dec. 11, 1928 |
| 2,050,188 | Lee | Aug. 4, 1936 |
| 2,140,782 | Arnold et al. | Dec. 20, 1938 |
| 2,302,600 | Cislak | Nov. 17, 1942 |
| 2,310,663 | Weinrich et al. | Feb. 9, 1943 |
| 2,381,055 | Hoyt | Aug. 7, 1945 |
| 2,435,038 | Gilbert et al. | Jan. 27, 1948 |
| 2,529,209 | Aye | Nov. 7, 1950 |